United States Patent
Patil et al.

(10) Patent No.: US 10,517,072 B2
(45) Date of Patent: Dec. 24, 2019

(54) AUTONOMOUS RESOURCE SELECTION FOR VEHICLE-TO-VEHICLE COMMUNICATIONS

(71) Applicant: QUALCOMM Incorporated, San Diego, CA (US)

(72) Inventors: Shailesh Patil, Raritan, NJ (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 15/435,255

(22) Filed: Feb. 16, 2017

(65) Prior Publication Data

US 2018/0049162 A1 Feb. 15, 2018

Related U.S. Application Data

(60) Provisional application No. 62/373,593, filed on Aug. 11, 2016.

(51) Int. Cl.
*H04W 72/04* (2009.01)
*H04L 29/08* (2006.01)
*H04W 72/10* (2009.01)

(52) U.S. Cl.
CPC ............. *H04W 72/04* (2013.01); *H04L 67/12* (2013.01); *H04W 72/10* (2013.01)

(58) Field of Classification Search
None
See application file for complete search history.

(56) References Cited

U.S. PATENT DOCUMENTS

| 2015/0215903 A1* | 7/2015 | Zhao | H04W 72/04 370/329 |
| 2015/0245193 A1* | 8/2015 | Xiong | H04W 76/14 370/328 |
| 2015/0327180 A1* | 11/2015 | Ryu | H04L 1/00 370/329 |
| 2017/0188391 A1* | 6/2017 | Rajagopal | H04W 74/0816 |
| 2017/0230937 A1* | 8/2017 | Nguyen | H04W 72/02 |

(Continued)

OTHER PUBLICATIONS

International Search Report and Written Opinion—PCT/US2017/041646—ISA/EPO—Oct. 6, 2017.

(Continued)

*Primary Examiner* — Nicholas Sloms
(74) *Attorney, Agent, or Firm* — Arent Fox, LLP Qualcomm Incorporated

(57) ABSTRACT

Various aspects related to selecting a resource selection procedure for V2V communications are described. In an aspect of the disclosure, a method, a computer-readable medium, and an apparatus for selecting a resource selection procedure for V2V transmissions, is described. The apparatus, e.g., a UE, may be configured to identify that recent sensing history information at the UE is unavailable for a sensing based resource selection procedure. The UE may be further configured to select, in response to identifying that the recent sensing history information is unavailable, a resource selection procedure based on configuration information obtained from a network entity. In various configurations, the UE may select a resource for a V2V transmission based on the resource selection procedure selected based on the configuration information.

30 Claims, 11 Drawing Sheets

(56) References Cited

U.S. PATENT DOCUMENTS

| | | | | |
|---|---|---|---|---|
| 2017/0238321 | A1* | 8/2017 | Sartori | H04W 72/0486 |
| | | | | 455/452.1 |
| 2017/0366920 | A1* | 12/2017 | Agiwal | H04W 4/70 |
| 2018/0020387 | A1* | 1/2018 | Van Der Velde | |
| | | | | H04W 36/0072 |
| 2018/0042023 | A1* | 2/2018 | Sheng | H04W 4/046 |
| 2018/0192397 | A1* | 7/2018 | Seo | H04W 72/02 |

OTHER PUBLICATIONS

Lenovo: "UE Autonomous Resource Selection for Semi-Persistent Transmission", 3GPP Draft; R1-164645, 3rd Generation Partnership Project (3GPP), Mobile Competence Centre; 650, Route Des Lucioles ; F-06921 Sophia-Antipolis Cedex; France, vol. RAN WG1, No. Nanjing, China; 20160523-20160527, May 13, 2016 (May 13, 2016), XP051090252, 3 Pages, Retrieved from the Internet: URL: http://www.3gpp.org/ftp/tsg_ran/WG1_RL1/TSGR1_85/Docs/ [retrieved on May 13, 2016].

Qualcomm Incorporated: "Details of Sensing Using Autonomous Resource Selection for V2V", 3GPP Draft; R1-166257 QC V2V Sensing, 3rd Generation Partnership Project (3GPP), Mobile Competence Centre ; 650, Route Des Lucioles ; F-06921 Sophia-Antipolis Cedex; France, vol. RAN WG1, No. Gothenburg, Sweden; 20160822-20160826, Aug. 21, 2016 (Aug. 21, 2016), 11 Pages, XP051125298, Retrieved from the Internet: URL: http://www.3gpp.org/ftp/Meetings_3GPP_SYNC/RAN1/Docs/ [retrieved on Aug. 21, 2016].

Qualcomm Incorporated: "Details of Sensing for v2v", 3GPP Draft; R1-164419_QC_V2V_SENSING, 3rd Generation Partnership Project (3GPP), Mobile Competence Centre ; 650, Route Des Lucioles ; F-06921 Sophia-Antipolis Cedex , France, vol. RAN WG1, No. Nanjing, China; 20160523-20160527, May 14, 2016 (May 14, 2016), XP051096460, 12 Pages, Retrieved from the Internet: URL: http://www.3gpp.org/ftp/tsg_ran/WG1_RL1/TSGR1_85/Docs/ [retrieved on May 14, 2016].

* cited by examiner

AUTONOMOUS RESOURCE SELECTION FOR VEHICLE-TO-VEHICLE COMMUNICATIONS

CROSS-REFERENCE TO RELATED APPLICATION(S)

This application claims the benefit of U.S. Provisional Application Ser. No. 62/373,593, entitled "AUTONOMOUS RESOURCE SELECTION FOR VEHICLE-TO-VEHICLE COMMUNICATIONS" and filed on Aug. 11, 2016, which is expressly incorporated by reference herein in its entirety.

BACKGROUND

Field

The present disclosure relates generally to communication systems, and more particularly, to vehicle-to-vehicle (V2V) communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In V2V communications, messages may be latency constrained, e.g., certain messages may need to be transmitted within a certain time period after generation. As such, selecting a resource for data transmission using a sensing based resource selection procedure, with a minimum 1 second of sensing history, may take more time than permitted by the latency constraints for message transmissions. As a result, by the time 1 second of sensing history becomes available, a message waiting to be transmitted may be invalid due to the information communicated by the message becoming old and/or invalid because of the latency/delay caused by the sensing time prior to transmission of the message.

SUMMARY

The following presents a simplified summary of one or more aspects in order to provide a basic understanding of such aspects. The summary is not an extensive overview of all contemplated aspects, and is intended to neither identify key or critical elements of all aspects nor delineate the scope of any or all aspects. The summary's sole purpose is to present some concepts of one or more aspects in a simplified form as a prelude to the more detailed description presented later.

Various features related to selecting a resource selection procedure for V2V communications, e.g., transmission of packets corresponding to V2V messages, are described. In a V2V communication system, normally a sensing based resource selection approach is used. However, under many conditions, resource selection using a sensing based resource selection procedure may introduce too much latency in message transmissions, e.g., V2V message transmissions. In such scenarios, sensing history information may be either not available and/or no longer valid at the given time, e.g., when the V2V message is waiting to be transmitted. In accordance with an aspect, a user equipment (UE) may identify that recent sensing history information at the UE is unavailable for a sensing based resource selection procedure, and may select a resource selection procedure based on configuration information. The configuration information may be obtained from a network entity, e.g., such as a base station or another network node, or may be preconfigured at the device. The configuration information may set forth rules and/or conditions indicating which type of resource selection procedure may be used for selecting a resource for V2V transmission. The resource selection procedure may include a random resource selection procedure, a sensing based resource selection procedure, or a combination of the two. In an additional aspect, selection of the resource selection procedure may be based on the priority of a packet to be transmitted by the UE.

The present disclosure presents methods and apparatus that may be used for V2V communications. For example, in an aspect of the disclosure, a method, a computer-readable medium, and an apparatus for selecting a resource selection procedure for V2V transmissions, is described. The apparatus, e.g., a UE, may be configured to identify that recent sensing history information at the UE is unavailable for a sensing based resource selection procedure. The UE may be further configured to select, in response to identifying that the recent sensing history information is unavailable, a resource selection procedure based on configuration information obtained from a network entity. In various configurations, the UE may select/identify a resource for a V2V transmission based on the resource selection procedure selected based on the configuration information.

While the methods and apparatus described herein are well suited for V2V communications system, the methods, apparatus and the various aspects described herein are applicable to a variety of different communication systems.

To the accomplishment of the foregoing and related ends, the one or more aspects comprise the features hereinafter fully described and particularly pointed out in the claims. The following description and the annexed drawings set forth in detail certain illustrative features of the one or more aspects. The features are indicative, however, of but a few of the various ways in which the principles of various aspects may be employed, and the description is intended to include all such aspects and their equivalents.

DETAILED DESCRIPTION

Figure 1:
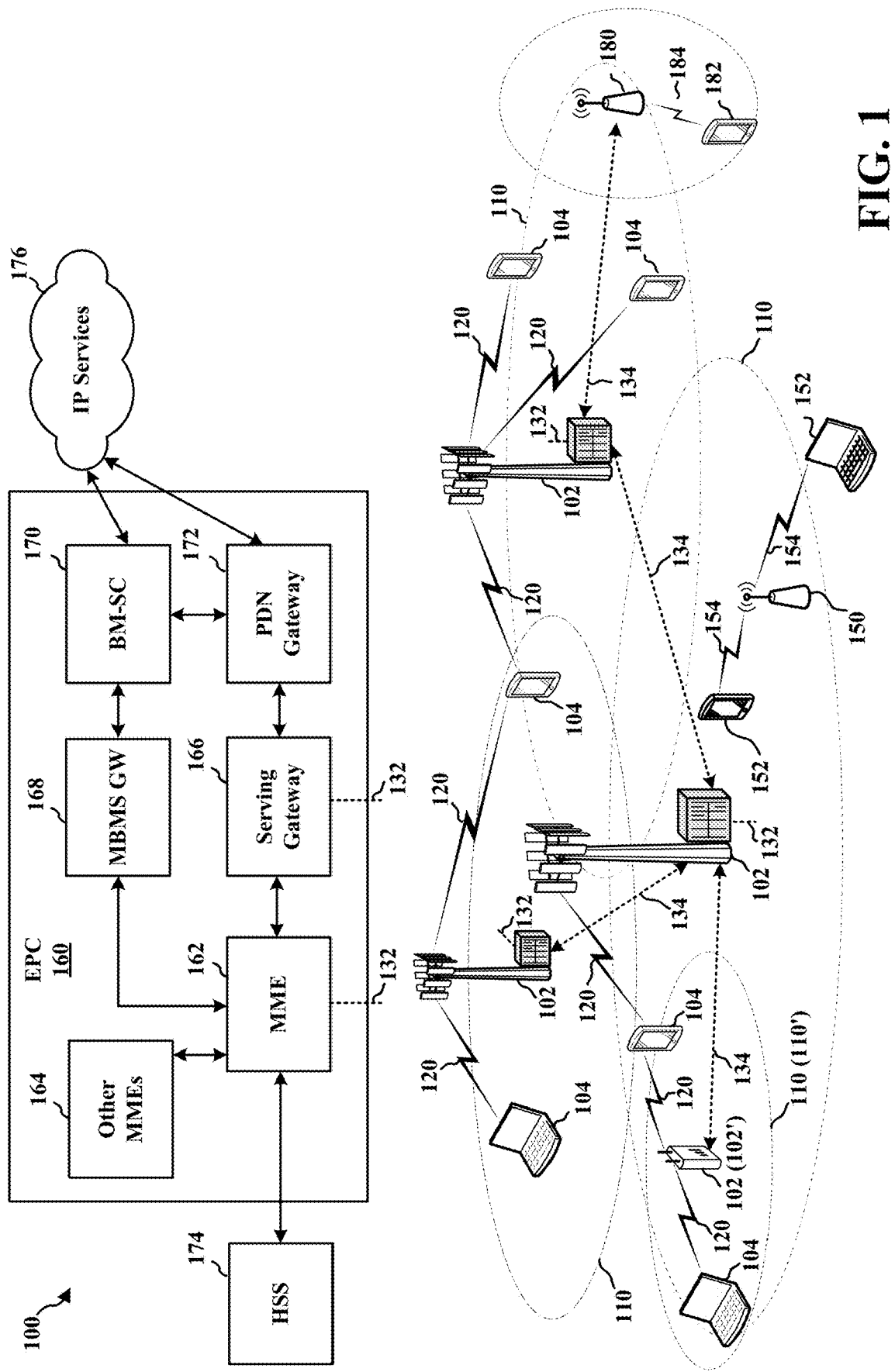
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
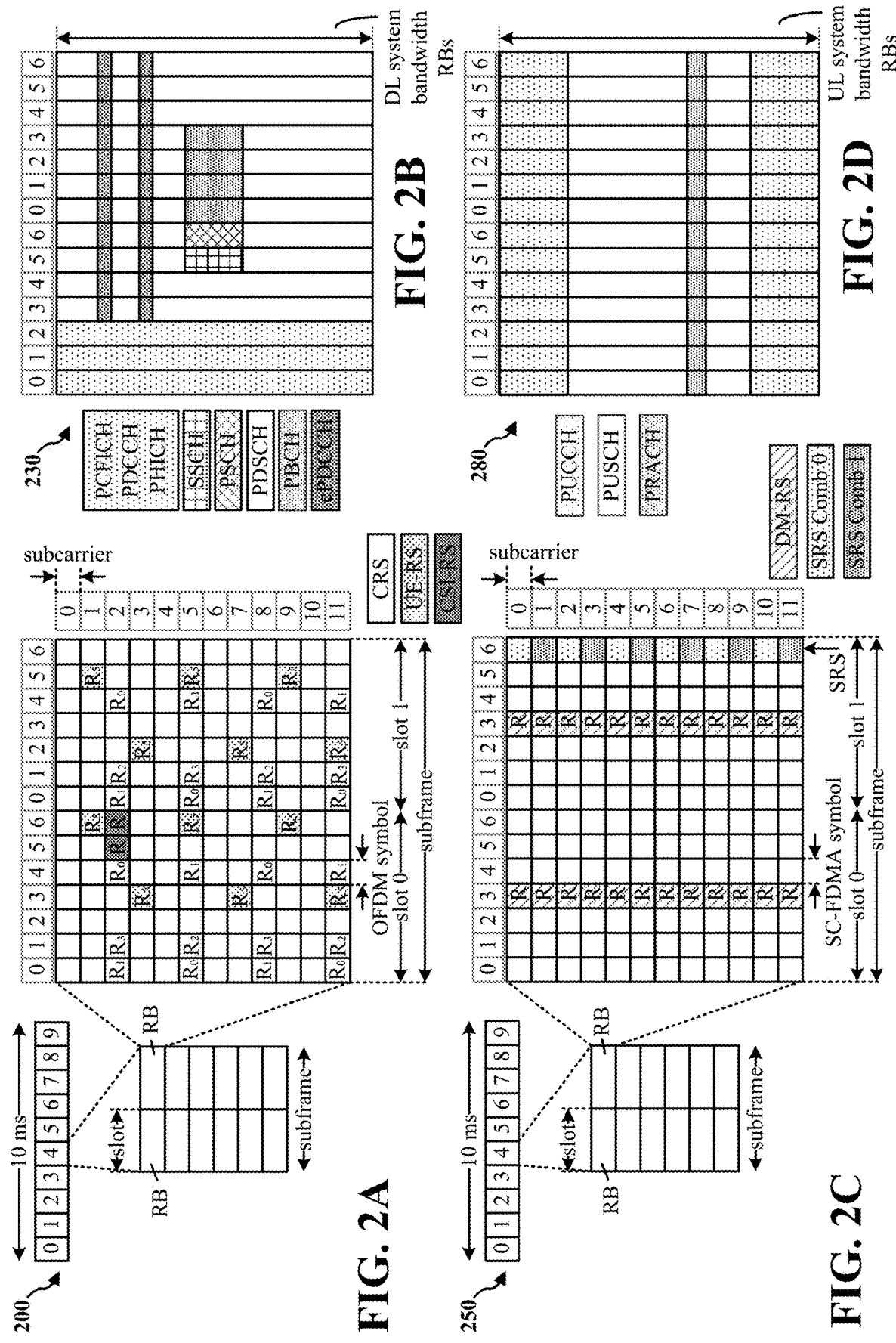
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
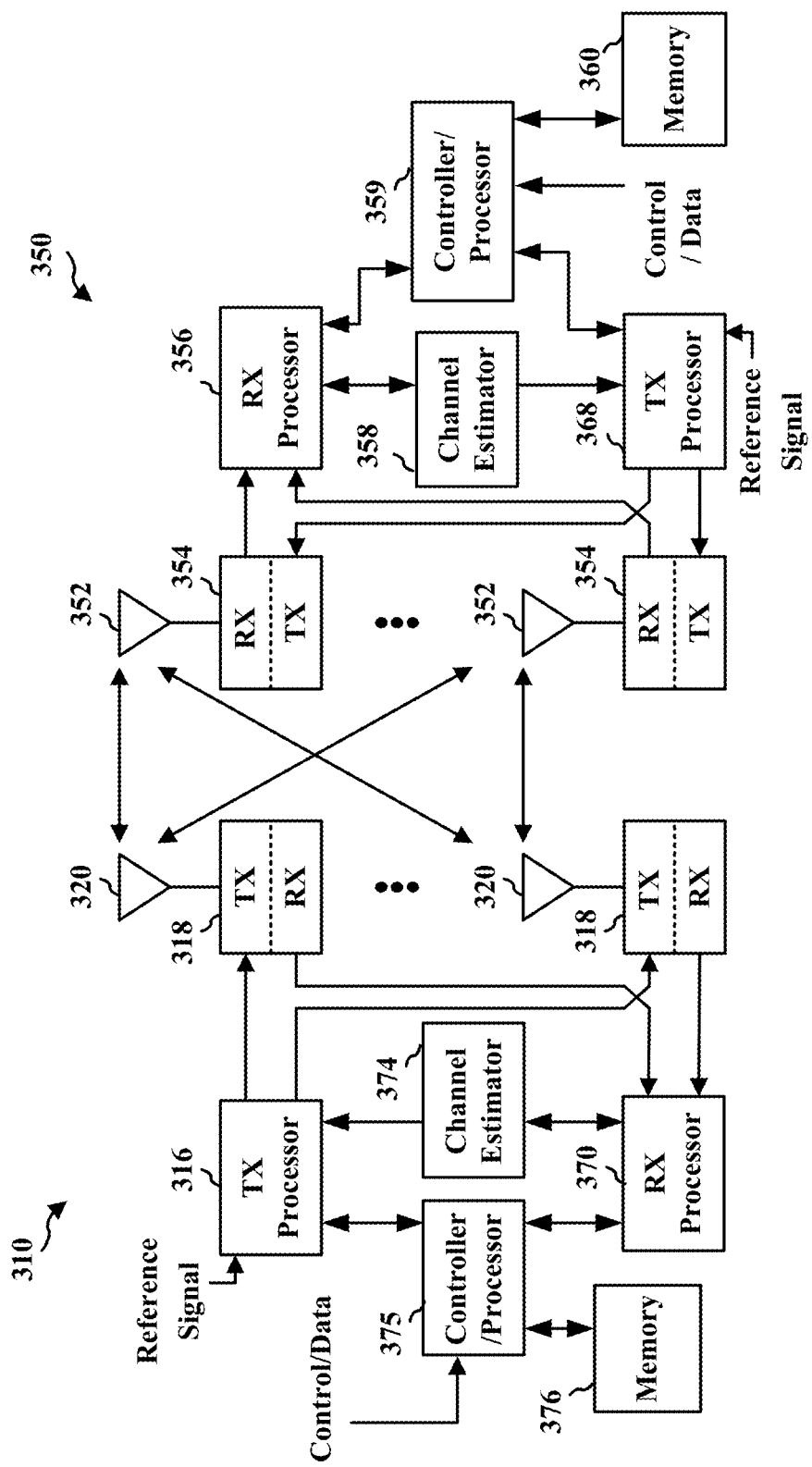
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
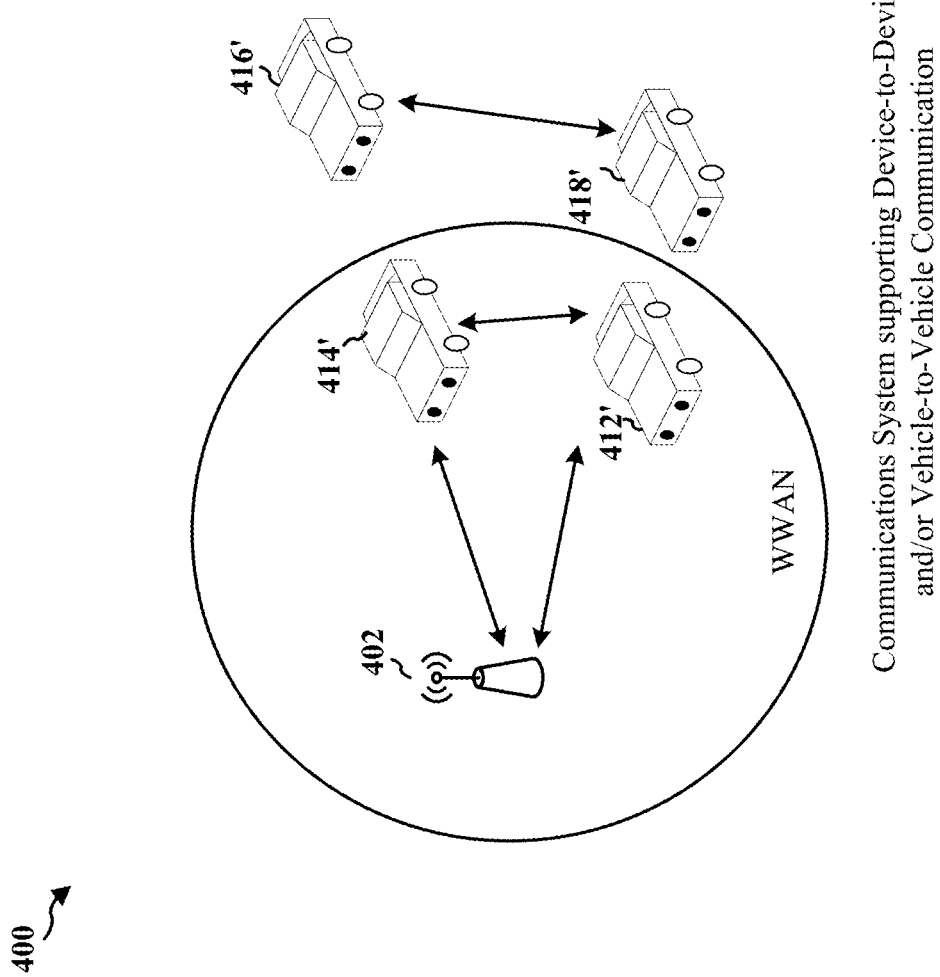
FIG. 4 is a diagram of a vehicle-to-vehicle communications system.

FIG. 4 is a diagram of a of a communication system 400 that supports V2V communications and/or peer-to-peer communications. V2V communications may be categorized as a type of peer-to-peer (also referred to as device-to-device (D2D) communication. The communication system 400 includes vehicles 412', 414', 416', 418' equipped with UEs 412, 414, 416, 418 (not shown), respectively. The V2V communication system 400 may overlap with a cellular communications system, such as, for example, a wireless wide area network (WWAN). Thus the communication system 400 may also include WWAN devices and support WWAN operations. Some of the UEs 412, 414, 416, 418 respectively associated with vehicles 412', 414', 416', 418' may communicate together in peer-to-peer communication using the DL/UL WWAN spectrum, some may communicate with the base station 402, and some may do both. In some configurations, the UEs 412, 414, 416, 418 respectively associated with vehicles 412', 414', 416', 418' may communicate via V2V communications, e.g., using a communication resources, e.g., time-frequency resources, dedicated for V2V type communication. For example, as shown in FIG. 4, the UEs 412, 414 (corresponding to vehicles 412', 414' respectively) are in V2V communication and the UEs 416, 418 (corresponding to vehicles 416', 418' respectively) are in V2V communication. The UEs 412, 414 are also communicating with the base station 402. In some configurations the communication resources used for peer-to-peer and/or V2V communication may correspond to one or more sidelink channels, such as a physical sidelink broadcast channel (PSBCH), a physical sidelink discovery channel (PSDCH), a physical sidelink shared channel (PSSCH), and/or a physical sidelink control channel (PSCCH). While described above as being equipped in a vehicle, a UE in the communication system 400 may be a vehicle itself with the capabilities of a communication device such as UE 104. The UEs may communicate using V2V communication which may be defined as a type of peer-to-peer communication (also referred to as device-to-device (D2D) communication).

The exemplary methods and apparatuses discussed infra are applicable to a variety of communications systems that support peer-to-peer and/or V2V type communications, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Resource selection using a sensing based resource selection procedure may introduce too much latency in message transmissions, e.g., V2V message transmissions, under a number conditions where the sensing information is not available and/or becomes invalid. Such conditions may include, for example, when a transmission channel and/or a communication resource pool for the V2V type communications changes, a UE handover, a power-on event, etc. In such scenarios, sensing history information may be either not available and/or no longer valid at the given time. For example, when a UE handover occurs from a first cell to a second cell, a communication resource pool for V2V communications in the second cell may change and/or the timing information (synchronization timing) of the second cell may be different than the timing followed by the first cell. In such a handover scenario, the previous sensing history information may no longer be valid in the second cell to which the handover occurred. In a power-on scenario, e.g., when a UE is turned on for operation, the sensing information may not be available (e.g., because the UE has just been turned on and no sensing was performed while the UE was off). As a result, messages such as V2V transmissions, which have a low latency constraint may result in transmission of an invalid message.

In an aspect, a UE may select a resource for transmission of, e.g., a data packet corresponding to a V2V message, by identifying that recent history information at the UE is unavailable for a sensing based resource selection procedure and may select a resource selection procedure based on configuration information obtained from a network entity, e.g., such as a base station or another network node. The resource selection procedure may be a random resource selection procedure, the sensing based resource selection procedure, or a combination of the two. In an additional aspect, selection of the resource selection procedure may be based on the priority of a packet to be transmitted by the UE.

Figure 5:
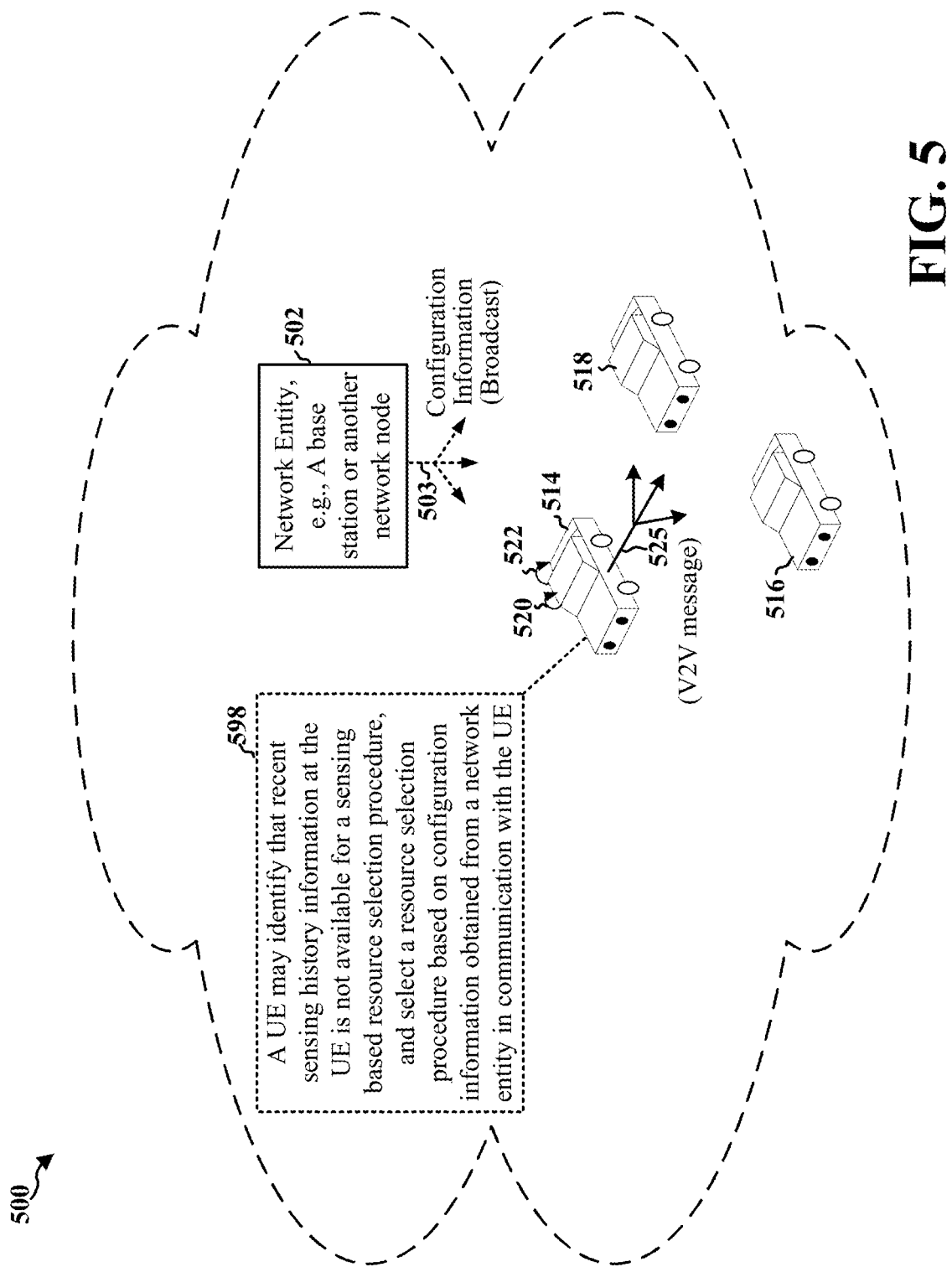
FIG. 5 illustrates an exemplary communication system and exemplary signaling and/or operations in the communication system, in accordance with an exemplary configuration.

FIG. 5 illustrates an exemplary communication system 500 and exemplary signaling and/or operations in the communication system 500, in accordance with an exemplary embodiment. The exemplary communication system 500 may be the same as or similar to communication system 400 and support V2V communications between devices. The communication system 500 may also support WWAN assisted communications. Thus in at least some configurations, the UEs in the communication system 500 communicate using V2V and vehicle-to-everything (V2X) type communications. As illustrated, the communication system 500 may include UEs which may be the vehicles shown in the drawing and/or user equipment devices in the vehicles. Accordingly, for discussion purposes the vehicles shown in FIG. 5 will be referred to as the UEs. The communication system 500 may be a part of the system and access network of FIG. 1 and may include many elements which may be the same as or similar to the elements discussed above with regard to FIG. 1. Various aspects related to the exemplary methods which may be used in the communication system 500 are discussed below.

As illustrated, the communication system 500 may include a plurality of UEs 514, 516, and 518 and a network entity 502 such as a base station or another network node. The UEs 514, 516, and 518 support V2V mode and thus perform V2V type communications. In the communication system 500, the UEs 514, 516, and 518 may periodically and/or otherwise transmit, e.g., broadcast, data packets corresponding to V2V messages. One type of V2V messages communicate vehicle information, e.g., information associated with a vehicle. The vehicle information may include, e.g., location of the UE (vehicle), moving direction of the UE (vehicle), speed of the UE (vehicle), etc. In some configurations, such vehicle information may be transmitted, e.g., as a broadcast, by the UEs, every 100 milliseconds (ms). When a UE has data to transmit, a resource selection may be made for transmitting the data using a sensing based resource selection mechanism. In the sensing based resource selection mechanism, a UE having data to transmit selects one or more resources to transmit the data based on channel sensing performed by the UE. In some configurations, the sensing is performed by each of the UEs (e.g., on an ongoing basis in the background) to determine which communication resources are suitable for transmitting the V2V data. The sensing operation may include monitoring resources, e.g., resources corresponding to a communication resource pool which may be a dedicated set of communication resources for V2V communications, to detect transmissions from other UEs. Such a monitoring allows a UE to determine which resources are occupied and not suitable for use in transmission and which resources are unoccupied. Each of the resources in the communication resource pool (for V2V communication) may have an identity (e.g., an identifier that may uniquely identify the resource) and the UEs 514, 516, 518 performing the sensing may measure energy received on the various resources being monitored. In some configurations, the sensing operation includes measuring energy on each of the resources being monitored and identifying resources which are unoccupied and thus suitable for use in transmission. The presence of energy, e.g., above a threshold, on a given resource may indicate that the resource is being used and thus may not be available for transmission.

Accordingly, in the above discussed manner, the sensing history information may be collected by each of the UEs 514, 516, and 518 based on sensing of transmissions detected from other UEs which may be using the V2V communication resource pool, and stored at each of the UEs. The sensing history information may be, e.g., a sliding window of recent sensing data such that the most recent sensing data of the past one (or more) second of sensing by the UEs 514, 516, and 518 is stored. In some configurations, the sensing may be performed by the UEs on an on-going basis (e.g., by each UE in the background while the UE is on) to allow the UEs 514, 516, and 518 to utilize the sensing data when a message needs to be transmitted. In an aspect, for a given UE that wishes to transmit a message, the sensing history information for the previous one second prior to resource selection may be considered relevant for determining whether a resource is being used by another UE or is in some way occupied.

In some configurations, a UE may store sensing history information for several prior seconds (relative to a current time) and use the most recent sensing history information to identify one or more resources for transmission of V2V data. Normally, a UE that may have data to transmit, may use the sensing history information to select a resource, e.g., a set of resource blocks (RBs), for transmission of V2V data. However, as discussed above, in some cases/conditions sensing history for the past one second may not be available or may not be valid, and resource selection using a sensing based resource selection procedure may introduce too much latency in transmissions, e.g., V2V data transmissions. In many such cases, by the time sensing data is available, e.g., after performing sensing to gather the sensing data for a time period (e.g., one or more seconds), the vehicle information to be transmitted may change and/or may no longer be valid, e.g., due to change in vehicle data such as the speed, direction and/or location. Thus, in accordance with an aspect, in such situations, e.g., where recent sensing history information is unavailable, a UE having data to transmit may use configuration information to determine a resource selection procedure to use for selecting a resource for the data transmission. In some embodiments, the configuration information may be obtained by the UEs 514, 516, and 518 from the network node such as the network entity 502. For example, the network entity 502 may transmit a broadcast message 503 including the configuration information. In some configurations, the configuration information is received at the UEs 514, 516, and 518 via the broadcast message 503 when the UE is in a radio resource control (RRC)_IDLE state or a unicast signaling message when the UE is in a RRC_CONNECTED state. In some configurations, the configuration information may be pre-configured in the UEs 514, 516 and 518. The configuration information may include a set of conditions and indicate a corresponding resource selection procedure (or sequence of resource selection procedures) to be used under the set of conditions. In some configurations, the configuration information may be relied upon in the cases where recent sensing history is unavailable or invalid. In certain configurations, when sensing history information for a predefined amount of time, e.g., which may be less than 1 second, is available, the network entity 502 may indicate to the UEs 514, 516, and 518 (via the configuration information) that a sensing based resource selection procedure may be used.

In accordance with an aspect, the UE 514 may determine whether recent sensing history information at the UE 514 is available for a sensing based resource selection procedure. For example, in an aspect, UE 514 may include a sensing history information identifying component, such as a specially programmed processor, or a processor executing specially programmed code stored in a memory, to determine/identify that sensing data at the UE 514 is available or not, e.g., by accessing the device memory where the sensing history information may be normally stored. For the purposes of discussion of FIG. 5, consider that UE 514 has V2V data to be transmitted but sensing history information, e.g., past one second sensing data, at the UE 514 is not available or is invalid. Based on a look up performed by the UE 514 at a given time, e.g., when the V2V data is waiting to be transmitted, the UE 514 may identify (520) that sensing history for the past one (or more) seconds is not available and/or stored sensing history information is invalid, e.g., due to being old or corresponding to a resource pool no longer being used. The sensing history information may not be available due to one or more reasons as previously discussed, for example, when the UE 514 has just been turned on and therefore no (or not enough) sensing history data is available at the current time. Another such scenario may be, for example, a hand over case where the earlier sensing history information may no longer be valid. The sensing history information may also be unavailable due to a resource pool and/or channel reconfiguration.

Accordingly, in accordance with an aspect, the UE 514 accesses configuration information (which may have been broadcast by the network entity 502 or otherwise pre-configured in the UE 514) to determine a resource selection procedure to be used for selecting a resource for V2V data transmission. The configuration information may include information indicating a resource selection procedure (or sequence of resource selection procedures) to be used under various conditions. For example, in an aspect, the configuration information may indicate that when sensing history information for a predetermined amount of time, e.g., 1 second or less than 1 second, is unavailable, then a random resource selection procedure should be used. In an aspect, the configuration information may indicate that when sensing history information for the predetermined amount of time is unavailable, but a V2V message to be transmitted is of low priority then a sensing based resource selection procedure should be used with a reduced sensing time which may also be specified in the configuration information. Thus in certain configurations, when sensing history information for a predefined amount of time, e.g., which may be less than 1 second, is available, the network entity 502 may indicate to the UEs 514, 516, and 518 (via the configuration information) that a sensing based resource selection procedure may be used. The configuration may indicate that a random resource selection procedure should be used when sensing history information for an indicated amount of time is unavailable and data packets to be transmitted are of high priority.

Accordingly, the UE 514 may select (522), in response to identifying that the recent sensing history information is unavailable, a resource selection procedure based on the configuration information. In some configurations, the resource selection procedure may be a random resource selection procedure, the sensing based resource selection procedure, or a combination thereof In some configurations, if based on the configuration information, it is determined that the UE 514 is to use the sensing based resource selection procedure, the network entity 502 may further specify, e.g., in the configuration information, the amount of time the UE should perform sensing. In some configurations, the sensing time period is a reduced time period, e.g., less than a one second sensing time period. For example in some configurations, the sensing period may be between 100 ms and 500 ms. In some configurations, if the configuration information indicates that the UE 514 is to use random resource selection, then the randomization function used for generating a pseudorandom number and the seed which is input to the randomization function may also be specified. Accordingly, in such configurations, the UE 514 may use the specified randomization function and seed for generating the pseudo-random number which is then used for identifying a resource for transmission. The random seed may be a function of the UE identity, e.g., an identifier of the UE 514 such as the international mobile subscriber identity (IMSI) of the UE 514, Media Access Control (MAC) identity or another such device identity. Another input to random function may be the time at which selection of the resource occurs.

In some configurations, the configuration information may indicate that when the sensing history information is not available, the UE should perform random selection, the network entity may also instruct the UE when to reselect to a resource using sensing. For example, when sensing history is not available, the configuration information may indicate that the UE should start with a random resource selection and transmit the V2V data, and may further indicate that the UE should switch to sensing based resource selection when sufficient sensing data is available, e.g., when sensing information for 500 ms is available the UE can use 500 ms of sensing information to perform resource reselection. Because sensing may be performed in the background on an ongoing basis, the UE 514 may initially select a transmission resource using a random selection procedure, but after a certain time period of sensing has elapsed, the UE 514 may reselect a resource for transmission based on sensing information gathered within that time period.

Following selection of a resource selection procedure, the UE 514 may select resource(s), e.g., from a communication resource pool corresponding to the selected type of resource selection procedure, in accordance with the selected resource selection procedure. In various configurations, information regarding the communications resource pool(s) to be used for V2V communications may be pre-configured or known to the UE 514. In some configurations, such information regarding the communications resource pool(s) may be communicated the UEs 514, 516, and 518 by the network entity 502 in a system information block (SIB). Next, the UE 514 may transmit (525) a V2V message (e.g., including one or more V2V packets communicating vehicle information) on the selected resource(s). In some embodiments, the V2V message transmission (525) may be a broadcast transmission.

Referring again to FIG. 5, in certain aspects the UE 514 may be configured (598) to identify that recent sensing history information at the UE is unavailable for a sensing based resource selection procedure, and select, in response to identifying that the recent sensing history information is unavailable, a resource selection procedure based on configuration information obtained from a network entity in communication with the UE.

Figure 6A:
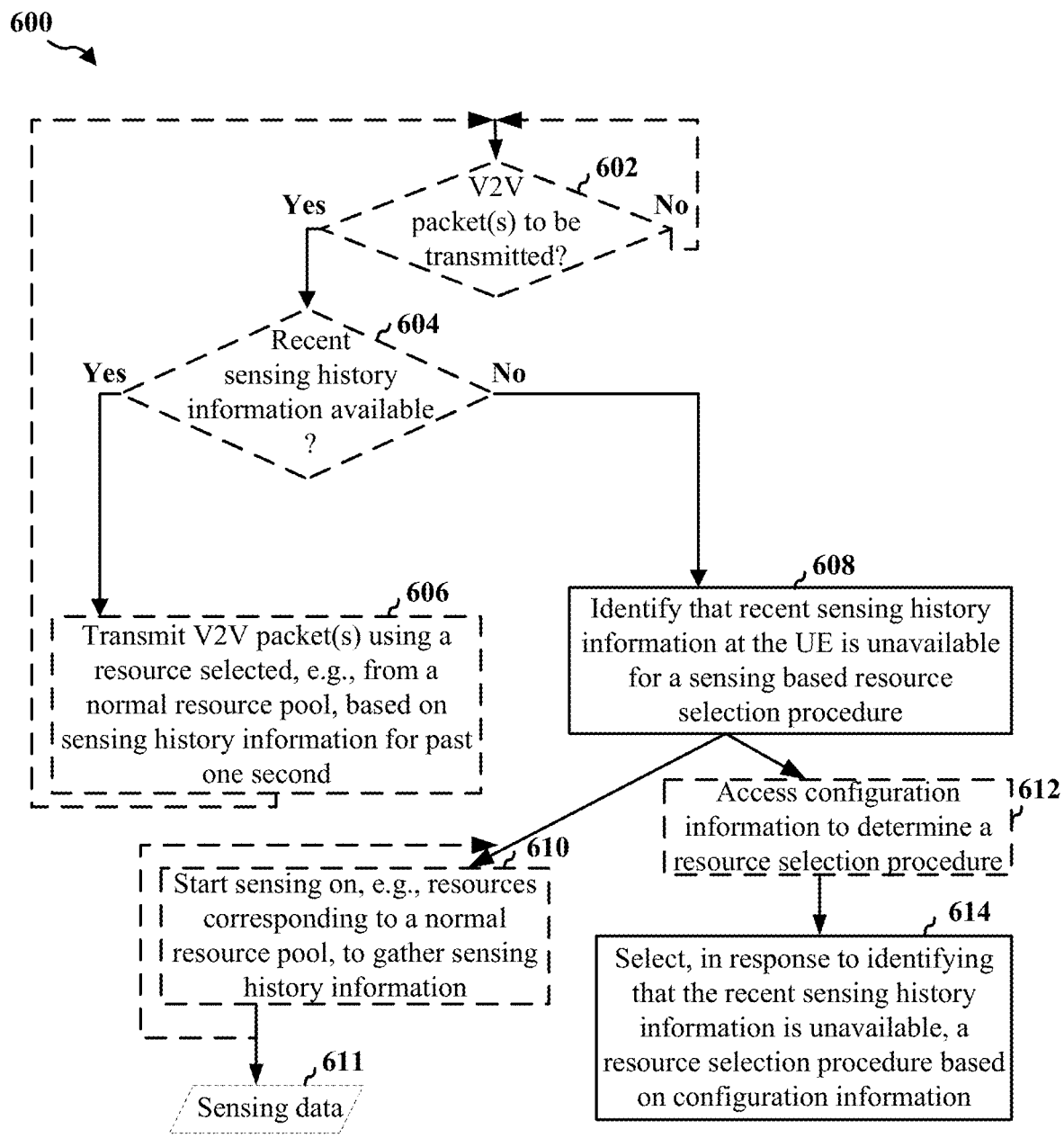
FIG. 6A is a first part of a flowchart of an exemplary method of wireless communication of a UE, in accordance with an exemplary configuration.

FIG. 6 is a flowchart 600 of an exemplary method of wireless communication of a first network in accordance with an aspect. Some of the operations may be optional as represented by dashed/broken lines. The method of flowchart 600 may be performed by e.g., UE 514 of the communication system 500. At 602, the UE may determine whether one or more data packets, e.g., corresponding to a V2V message, are generated and available for transmission. For example, the UE may monitor a status of transmission buffer to check if there are any data packets waiting to be transmitted. For example, in communication system 500 messages including vehicle information (e.g., such as location, moving direction, speed etc.) may be generated at a UE, e.g., UE 514, 516, and 518, which need to be transmitted within a set amount of time after generation to satisfy a specified latency requirement for such type of messages, e.g., within 100 ms of being generated. Thus once data packet(s) corresponding to such messages are available, the UE needs to identify a resource for transmission and transmit the data packet(s) within a certain time period of generation. Accordingly, at 602 the UE may determine if such information is available and ready for transmission. If no such data packets are available, in some configurations the UE may monitor for availability of such data packets on an ongoing basis as indicated by the loop back. However, if one or more data packets are available for transmission, then at 604 the UE determines whether recent sensing history information, e.g., for the past one second, is available and valid. If it is determined that the sensing history information is available and valid, e.g., based on a comparison of a current time with a time to which stored sensing history corresponds, then at 606 the UE may proceed to transmit V2V data packet(s) using a resource selected based on the sensing history information for the past one second. In some configurations, the selected resource is selected from a communication resource pool (sometimes referred to herein as a normal resource pool) which is different from another resource pool (sometimes referred to herein as an exceptional resource pool) used in cases where random resource selection is used in accordance with the features of some embodiments as will be discussed. The resource may be a time-frequency resource from a set of resources for V2V communications. For example, in an OFDM configuration the resource may be one or more tone-symbols corresponding to one or more OFDM symbols. In some configurations a semi-persistent resource selection may be used, that is, the same resource selected for transmitting a current V2V message (e.g., vehicle information broadcast) may be used again for the next V2V message transmission.

If at 604 it is determined that the sensing history information is unavailable, then at 608 the UE identifies that recent sensing history information at the UE is unavailable for a sensing based resource selection procedure. For example, with reference to FIG. 5, the UE 514 may identify (520) that due to one of a variety of conditions (as previously discussed) the sensing history information is not available, and/or not valid. In accordance with an aspect, if the UE has not already started the sensing operation, at 610 the UE initiates sensing (e.g., on resources in the normal communication resource pool) to start gathering history information and the sensing may be performed on an ongoing basis in the background, e.g., in parallel with other UE operations. In various configurations, the sensing includes monitoring for transmissions from other UEs, e.g., on the resources of the normal communication resource pool. The sensing data 611 may represent the data output of the sensing operation and may include sensing history information, e.g., gathered in the past 100 ms or so. It should be appreciated that from a time perspective, initially prior to initiating the sensing operation, the sensing data 611 may not include any sensing history information, but as more and more time elapses, the sensing data 611 may include sensing history for the elapsed time. For example, at some point in time the sensing data may include past 100 ms of sensing history, e.g., after 100 milliseconds elapsed since start of sensing. At some point in time (e.g., by which multiple V2V transmission may have occurred) the sensing data may include past 1 second of sensing history. However, in some configurations the UE may store sensing history of past 1 second or less or more time, and use the sensing history information of a specified amount of time (e.g., indicated in the configuration information) for resource selection if the configuration information instructs use of sensing based resource selection.

Asynchronously with the operation at 610, upon identifying that sensing history information is unavailable, the UE at 612 accesses configuration information, e.g., which may be obtained from a network entity or may be preconfigured, to determine a resource selection procedure. For example, with reference to FIG. 5, the UE 514 may obtain the configuration information from the network entity 502 which may have broadcast the configuration information (e.g., via the broadcast message 503) to the UEs in the communication system 500. In some configurations, the configuration information is received at the UE via a broadcast message (e.g., broadcast message 503) when the UE is in a radio resource control (RRC)_IDLE state or a unicast signaling message when the UE is in a RRC_CONNECTED state. In some configurations, the configuration information may be preconfigured in the UEs. In various configurations the resource selection procedure may be one of a random resource selection procedure, the sensing based resource selection procedure, or a combination of the two. At 614 the UE selects, in response to identifying that the recent sensing history information is unavailable, a resource selection procedure based on the configuration information.

Figure 6B:
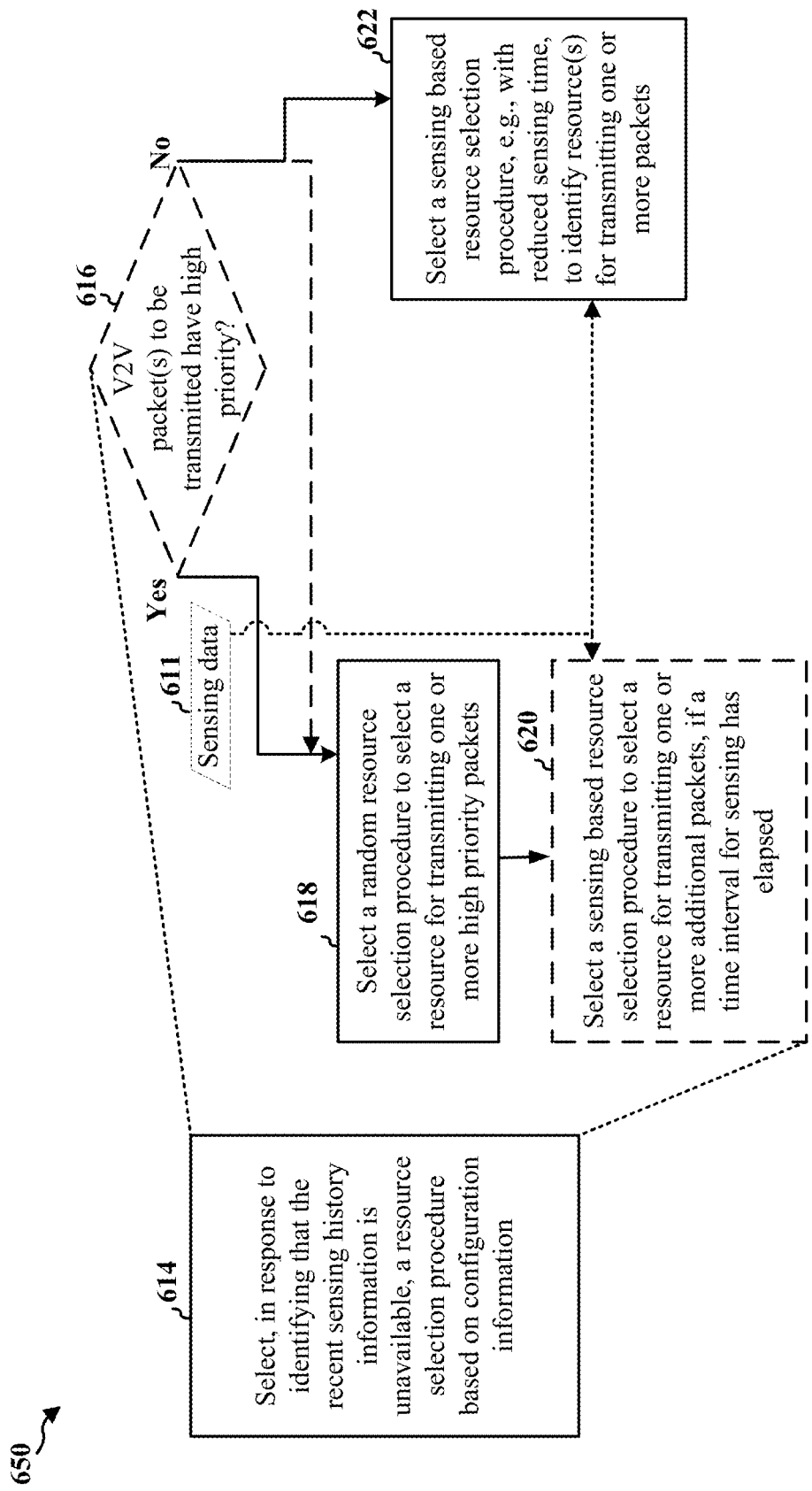
FIG. 6B illustrates a second part of the flowchart of the exemplary method of wireless communication illustrating operations that may be performed by the UE as part of selecting a resource selection procedure based on configuration information.

FIG. 6B is a drawing 650 illustrating a second part of the flowchart 600 illustrating operations that may be performed by a UE as part of selecting a resource selection procedure based on the configuration information at 614. Thus in some configurations, the UE may perform one or more of the operations illustrated in FIG. 6B. as part of selecting (614) a resource selection procedure based on the configuration information. In an aspect, the configuration information may include information regarding different resource selection procedures to select under different conditions, and may further include additional information to implement a given selection procedure in some embodiments. At 616, the UE determines whether the V2V packet(s) to be transmitted have a high priority level. In some configurations, a priority may be associated with the packets corresponding to the various types of V2V messages that are transmitted from the UE. The UE may be aware and/or determine a priority associated with the packet(s) to be transmitted, e.g., based on the type of V2V message to which packet(s) to be transmitted correspond. In an aspect, selecting a resource selection procedure may include determining priority of the current V2V transmission and choosing a resource selection procedure according to the priority of the data packets to be transmitted. The configuration information may include information needed by the UE to determine an appropriate resource selection procedure for a given type of transmission based on the priority. For example, if the packet to be transmitted from the UE 514 is a high priority packet (e.g., a packet associated with a collision/accident related V2V message), the configuration information may indicate such accident/collision related message transmissions (having high priority) should not be delayed due to unavailability of sensing history information and the UE should select a resource, for such high priority transmissions, using a random resource selection procedure. Accordingly, if at 616 it is determined that the data packets waiting to be transmitted have high priority, then in some configurations at 618, the UE selects the random resource selection procedure for selecting a resource for transmitting the one or more data packets. As discussed further below, one or more of the operations (e.g., resource identification and transmission) illustrated with respect to FIG. 7 may be performed as part of the random resource selection procedure selected at 618.

In some configurations, where the configuration information specifies use of the random resource selection procedure, the configuration information may further indicate when, e.g., a time period after which, the UE 514 may reselect to a resource, e.g., another resource, using the sensing based resource selection procedure. For example, the configuration information may indicate that when sensing history information is unavailable, the UE 514 may use the random resource selection procedure for immediate transmissions but may additionally specify that once sensing history data for a certain time period (e.g., 100 ms, 200 ms, 500 ms etc.) is gathered, the UE 514 should switch to the sensing based resource selection to identify a resource for subsequent transmissions. In some such configurations, at 620 the UE selects the sensing based resource selection procedure for transmitting additional packets if a time interval for sensing has elapsed, e.g., by the time the additional one or more packets are ready for transmission. Thus, as can be appreciated the operation at 620 may use the sensing data 611 as part of the sensing based resource selection procedure. For example, the configuration information may indicate that while the UE may start with the random resource selection for transmitting available data without delay, after 100 ms have elapsed (with the sensing operation at 610 being going on in parallel) the UE may select the sensing based resource selection procedure and use the available sensing data (611) for the indicated time, e.g., 100 ms, to identify and select a resource for the next one or more additional packets to be transmitted. In various configuration, as long as sensing history information is available, the UE may continue using the sensing based resource selection procedure. As discussed further below, one or more of the operations (e.g., resource identification using sensing history information, and transmission) illustrated with respect to FIG. 9 may be performed as part of the sensing based resource selection procedure selected at 620.

On the other hand, if at 616 it is determined that the data packets waiting to be transmitted do not have a high priority, then in some configurations at 622, the UE may select the sensing based resource selection procedure, with an indicated amount of reduced sensing time, for selecting a resource for transmitting the one or more data packets. For example, if the packet to be transmitted from the UE 514 is a normal or low priority packet (e.g., a packet associated with a routine vehicle information broadcast message), the configuration information may indicate that such transmissions (having normal or low priority) may be acceptable if slightly delayed, e.g., by 100 ms due to unavailability of sensing history information and the UE may select a resource, for such normal or low priority transmissions, using the sensing based selection procedure after the indicated amount of sensing time has elapsed. In some such configurations, the indicated sensing time is a reduced time period compared to the one second sensing time period normally used. For example, the configuration information may indicate that the UE 514 may select a resource based on the sensing based resource selection procedure but with a reduced sensing period of, e.g., 100 ms, 500 ms or other shortened sensing duration less than 1 second. Accordingly, in some configurations, for normal or low priority packets, at 622 the UE selects the sensing based selection procedure for selecting a resource for transmitting the one or more data packets but with a reduced (indicated) sensing time period. As discussed further below, one or more of the operations (e.g., resource identification using sensing history information, and transmission) illustrated with respect to FIG. 9 may be performed as part of the sensing based resource selection procedure. In a further additional aspect, UE 514 may assign different priorities to the low priority packets. That is, multiple low priorities may be configured at the UE 514 based on, e.g., type of the V2V message to which the packets correspond. In addition, the configuration information (e.g., received from network entity 502 or pre-configured) may further indicate multiple corresponding sensing periods for the different priorities. For instance, UE 514 may configure the packets of low priority with three different priorities —$P_{low1}$, $P_{low2}$, and $P_{low3}$, with $P_{low1}$ being the highest of the low priorities and $P_{low3}$ being the lowest of the low priorities. In configuration, the UE 514 may configure packets with $P_{low3}$ priority with a sensing period of 300 ms, packets with $P_{low2}$ priority with a sensing period of 200 ms, and/or packets with $P_{low1}$ priority with a sensing period of 100 ms.

In still some other configurations, regardless of the priority of the V2V packets to be transmitted, a UE may select the random resource selection procedure for selecting the resource for transmitting the one or more data packets upon identifying (608) that recent sensing history information is unavailable (as indicated by the broken arrow from the negative (No) determination point at determination block 616 to block 618). For example, in some configurations, the configuration information may specify that regardless of the type of V2V transmission and/or priority associated with such a transmission, the UE should use the random resource selection whenever the sensing history information is unavailable and/or not valid. In some configurations, the configuration information may further indicate a time period after which the UE may switch to the sensing based resource selection procedure to reselect a resource for subsequent transmissions.

Figure 7:
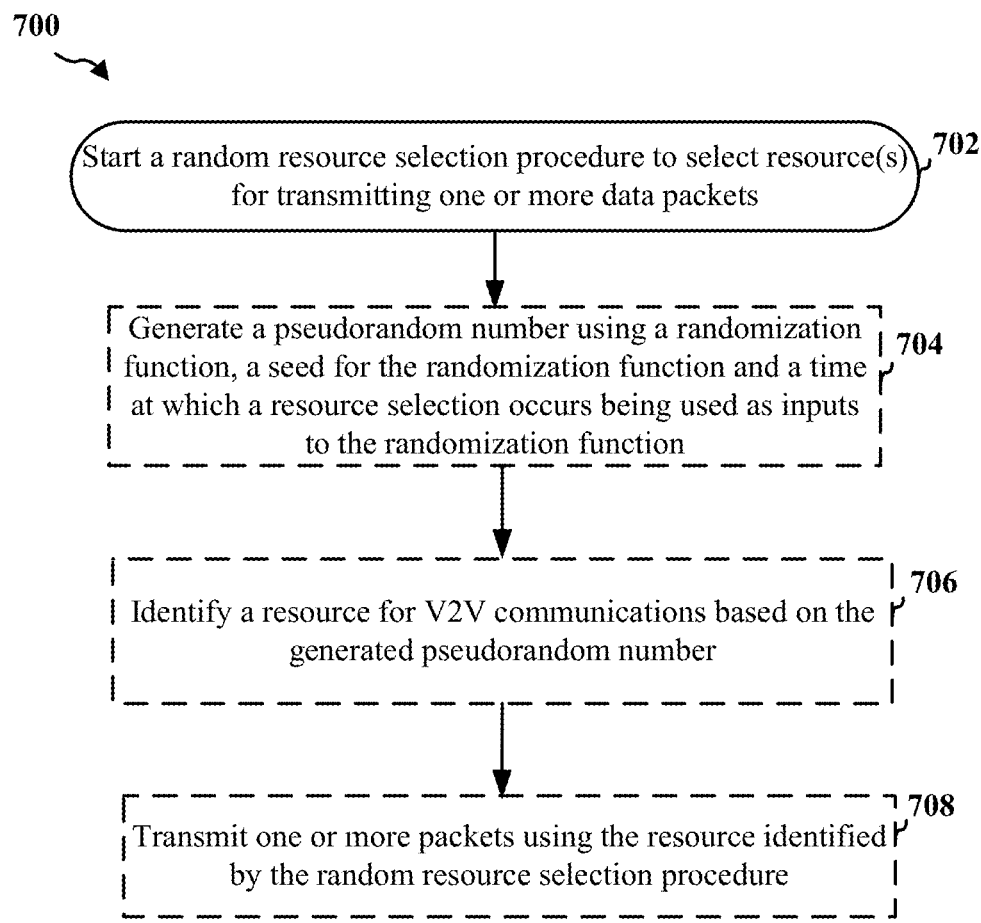
FIG. 7 illustrates a flowchart of an exemplary random resource selection method, in accordance with an aspect of some configurations.
Figure 8:
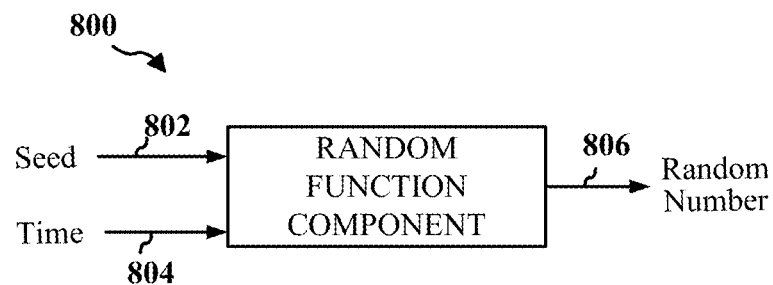
FIG. 8 is a drawing illustrating input(s) and output of an exemplary random function component used in a UE in some configurations.

FIG. 7 illustrates a flowchart 700 of an exemplary random resource selection method, in accordance with an aspect of some configurations. The random resource selection procedure/method of flowchart 700 may be implemented by a UE, e.g., such as UE 514, following selection of the random resource selection procedure (at 618) in the method of flowchart 600. The exemplary random resource selection method starts at 702, e.g., with the selection of the random resource selection procedure by the UE 514 for transmitting one or more V2V data packets, e.g., based on the configuration information in the manner discussed above in detail with respect to FIGS. 6A-6B. In accordance with an aspect, at 704 the UE 514 generates a pseudorandom number, e.g., using a random function (sometimes referred to as the RAND function) as illustrated in FIG. 8 and discussed in more detail below. The generated pseudorandom number follows the properties of random numbers, e.g., that the generated number cannot be reasonably predicted better than by a random chance. The process of generating the random number will now be discussed with reference FIG. 8 which illustrates an exemplary random function component 800, e.g., a random number generator, and input(s) and output of the random function component 800. The random function component 800 may be used in the UEs, e.g., UEs 412, 414 and/or UEs 514, 516, and 518 in some configurations. In accordance with an aspect, a seed for the randomization function is a first input 802 and a time at which a random resource selection occurs, e.g., a current time of pseudorandom number generation, is a second input 804 to the random function component 800. As illustrated, the output 806 of the random function component 800 is the generated pseudorandom number. In some configurations, the seed (input 802) is specified by the configuration information obtained from the network entity 502. In some other configurations, the seed (input 802) can be configured/pre-configured in the UE or be a function of UE identity, e.g., an identifier of the UE such as the IMSI of the UE, MAC identity or another such device identity.

Referring again to FIG. 7, at 706 the UE identifies a resource for V2V communication, e.g., transmission of the one or more V2V data packets, based on the generated pseudorandom number. In some configurations, the resource for transmission is identified using the generated pseudorandom number, from a plurality of resources in a first communication resource pool, e.g., an exceptional resource pool, which is different from a second communication resource pool, e.g., a normal resource pool, used in the sensing based resource selection procedure. The information regarding the first and the second communication resource pool may be indicated in the configuration information obtained from the network entity 502, pre-configured, or may be communicated to the UE separately from the configuration information obtained from the network entity 502. In various configurations, each resource in a given resource pool, e.g., the exceptional resource pool, may have an associated identifier. In accordance with an aspect, the generated pseudorandom number is such that it may be mapped to an identifier of a resource in the exceptional resource pool. The resource corresponding to the identifier to which the generated pseudorandom number is mapped, may then be selected/identified for the V2V transmission. Such a random selection/identification of the resource based on the generated pseudorandom number is referred to as the random resource selection.

At 708, the UE transmits one or more packets, e.g., the one or more V2V data packets waiting to be transmitted, using the resource identified by the random resource selection procedure. For example, with reference to FIG. 5, following the selection/identification of a communication resource using a selected resource selection procedure based on the configuration information, the UE 514 transmits (525), e.g., broadcasts, one or more packets corresponding to a V2V message.

Accordingly, in some configurations a UE may select the random selection procedure, and identify a random resource as described above for transmitting V2V messages.

Figure 9:
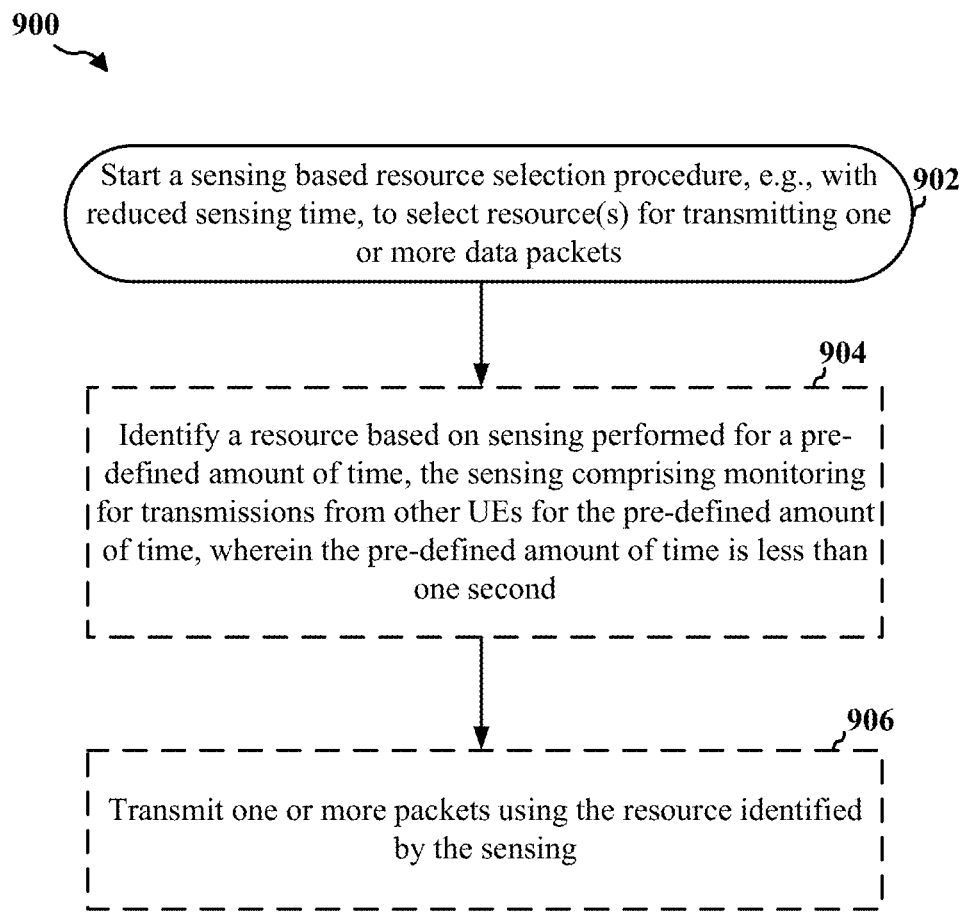
FIG. 9 illustrates a flowchart of an exemplary sensing based resource selection method, in accordance with an aspect of some configurations.

FIG. 9 illustrates a flowchart 900 of an exemplary sensing based resource selection method, in accordance with an aspect of some configurations. The sensing based resource selection procedure/method of flowchart 900 may be implemented by a UE, e.g., such as UE 514, following selection of the sensing based resource selection procedure (e.g., at 620/622) in the method of flowchart 600. The exemplary sensing based resource selection method starts at 902, e.g., with the selection of the sensing based resource selection procedure by the UE 514 for transmitting one or more V2V data packets, e.g., based on the configuration information in the manner discussed above in detail with respect to FIGS. 6A-6B. In accordance with an aspect of some configurations, the sensing based resource selection of flowchart 900 may be implemented with a reduced sensing time, e.g., less than 1 second of sensing time period, specified by the configuration information. At 904, the UE 514 may identify a resource based on sensing performed for a pre-defined amount of time. In various configurations, the sensing includes monitoring, by the UE 514, for transmissions from other UEs for the pre-defined amount of time. As discussed above with regard to the operation at 610 of flowchart 600, the UE may start the sensing operation earlier, e.g., upon determining that recent sensing history information is not available and/or not valid. If the sensing has not already been started, the UE may start the sensing operation upon determining (e.g., at 620/622) that sensing based resource selection is to be used. In some configurations, the sensing operation is performed e.g., on resources in the normal communication resource pool. While the sensing based resource selection may be used in accordance with the conditions specified by the configuration information, in accordance with an aspect of some configurations, the sensing history information needed to select/identify a resource for transmission of the V2V data packets may correspond to a reduced time period, e.g., the pre-defined time period. In some configuration the pre-defined amount of time is less than 1 second, e.g., 100 ms, 200 ms, 300 ms, 500 ms etc., as specified by the configuration information. Thus, while sensing may be performed, e.g., on an on-going basis, periodically, or in accordance with a specified schedule for sensing, in some configurations the sensing history data for a shortened sensing time period (e.g., less than 1 second) may be used to identify the resource for V2V communication. For example, the sensing history data may indicate measured/estimated energy on various resources in the normal communication resource pool. In one aspect a resource with the lowest measured/estimated energy may be identified/selected. In some configurations, the UE may use a predetermined energy threshold to select/identify a resource, e.g., with any of the resources having energy lower than the predetermined energy threshold being considered to be available. In some such configurations, the UE may identify/select any one or more of the resources which are considered available (based on the threshold energy comparison) for transmission.

Following the identification of the resource, at 906 the UE transmits one or more packets, e.g., the one or more V2V packets waiting to be transmitted, using the resource identified based on the sensing performed for the pre-defined time period. For example, with reference to FIG. 5, following the selection/identification of a resource, the UE 514 transmits (525), e.g., broadcasts, one or more V2V packets corresponding to a V2V message. In some configurations, where the random resource selection may have been used to identify a resource for a previous transmission (e.g., as discussed with respect to 618), the one or more V2V packets may be the additional V2V packets transmitted after the initial transmission of the one or more V2V packets.

Thus, as described above, UE 514 may autonomously select a resource for transmitting vehicle information using random resource selection or sensing based resource selection or a combination of the two, based on message type, priority, latency constraints, configuration information for selecting a resource, etc.

Figure 10:
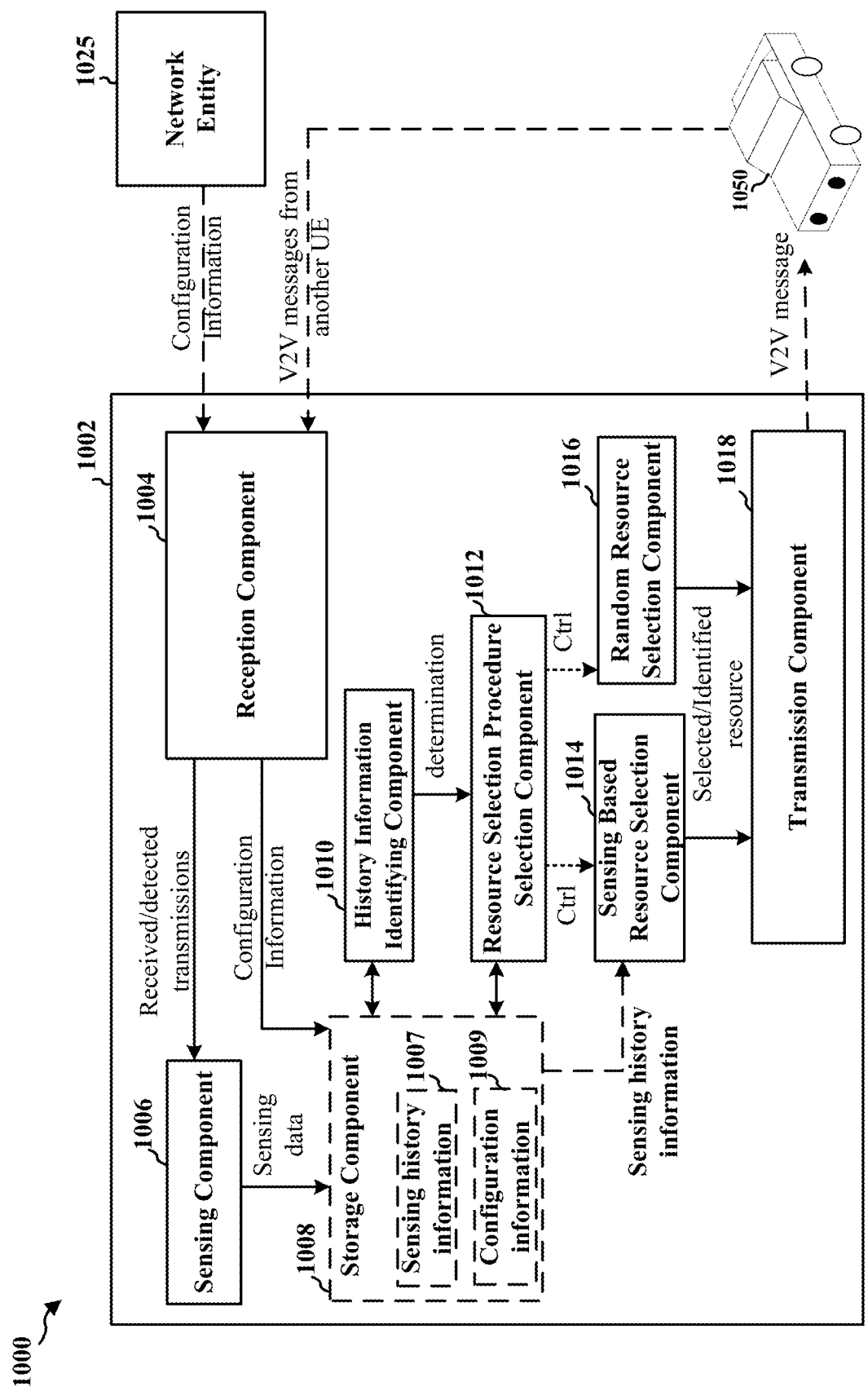
FIG. 10 is a conceptual data flow diagram illustrating the data flow between different means/components in an apparatus.

FIG. 10 is a conceptual data flow diagram 1000 illustrating the data flow between different means/components in an exemplary apparatus 1002 which may be used for V2V communications in some configurations. The apparatus 1002 may be a UE, e.g., such as UE 514. The apparatus 1002 may include a reception component 1004, a sensing component 1006, a storage component 1008, a history information identifying component 1010, a resource selection procedure selection component 1012, a sensing based resource selection component 1014, a random resource selection component 1016, and a transmission component 1018.

The reception component 1004 may be configured to receive and process messages and/or information from other devices such as the network entity 420 and/or other UEs such as UE 1050. For example, the reception component 1004 may be configured to receive the configuration information, e.g., such as configuration information via the broadcast message 503 from the network entity 502 of FIG. 5. The reception component 1004 may be further configured to receive V2V messages, e.g., vehicle information updates, traffic updates, collision/accident related messages etc., from one or more other UEs such as UE 1050.

The sensing component 1006 may be configured to perform sensing in accordance with features of various configurations discussed above. The sensing operation may include monitoring for transmissions, e.g., on a set of resources (also referred to as a resource pool), from other UEs. In some configurations, the sensing component 1006 may be configured to measure energy/power on the set of resources (e.g., resources of a normal resource pool configured for V2V communications) to determine which one or more of the resources are suitable for use in transmitting data packets corresponding to a V2V message. The sensing component 1006 may be further configured to output the energy/power measurements of various resources being sensed in a given time period as the sensing data for that time period. For example, each resource may be identified by an identifier and the sensing data may indicate the energy measured in the sensing operation for each of a plurality of resources identified by their respective identifiers. In addition and/or as an alternative to energy measurement for each of the plurality of resources, the sensing data output by the sensing component 1006 may include the identifiers of the resources which have been found to be suitable for V2V message transmission, e.g., due to measured energy being less than a threshold level. In such configurations, the sensing data output by the sensing component 1006 may include the identifiers of resources which have been found to be suitable for V2V message transmission in the given sensing time period, e.g., in the past 1 second or less than 1 second.

The storage component 1008 is, e.g., a memory or a portion of memory, and is configured to store the most recent sensing data received from the sensing component 1006 as the sensing history information 1007. In some configurations, the sensing history information 1007 includes the sensing data of most recent past 1 second or less. The sensing history information 1007 may be associated with transmissions received at the apparatus 1002 from other UEs in a previous one second. The sensing component 1006 may be configured to update/overwrite the stored sensing history information 1007 in the storage component 1008 to reflect the most recent sensing results. The storage component 1008 may further include configuration information which may have been received from the network entity 1025 or pre-configured in the apparatus 1002, e.g., pre-stored.

The history information identifying component 1010 may be configured to identify that recent sensing history information not available at the apparatus 1002 and/or not valid for a sensing based resource selection procedure. As previously discussed, the recent sensing history information may not be available at a time for a variety of reasons, for example, due to a resource pool configuration change (which renders sensing history for a different/previous resource pool invalid or irrelevant), a transmission channel change, a handover, a power-on event, or a combination of such events. Thus when a data packet corresponding to a V2V message is to be transmitted, in accordance with an aspect, the history information identifying component 1010 determines whether sensing history information, e.g., for the past 1 second, is available. When such sensing history information is unavailable and/or if the available sensing history of past 1 second is invalid, the history information identifying component 1010 may determine/identify that recent sensing history information is unavailable and pass the determination to the resource selection procedure selection component 1012.

The resource selection procedure selection component 1012 may be configured to select, in response to the identification that the recent sensing history information is unavailable, a resource selection procedure based on configuration information. The configuration information may be the configuration information 1009 stored in the storage component 1008 and may be obtained from the network entity 1025 in communication with the apparatus 1002 or may have been pre-configured. In some configurations, the selection component 1012 may be configured to select the resource selection procedure further based on a message type (e.g., type of V2V message to be transmitted), priority of the message to be transmitted, latency constraints associated with a message to be transmitted. In some configurations, the selection component 1012 may be configured to select, based on the configuration information 1009, a random resource selection procedure, or the sensing based resource selection procedure, or a combination of the two. In some configurations, the selection component 1012 may be further configured to determine a priority associated with a message (or data packets of the message) to be transmitted, as part of selecting a resource selection procedure. In some configurations, the selection component 1012 may be configured to select, based on the configuration information 1009, the random resource selection procedure when it is determined that the message to be transmitted has a high priority. For example, the configuration information 1009 may specify that for transmitting high priority data packets (e.g., corresponding to V2V messages) the random resource selection procedure is to be selected for resource selection/identification. In some configurations, the selection component 1012 may be configured to select, based on the configuration information 1009, the sensing based resource selection procedure when it is determined that the message to be transmitted has a normal or low priority. For example, the configuration information 1009 may specify that for transmitting normal or low priority data packets (e.g., corresponding to V2V messages) the sensing based resource selection procedure is to be selected for resource selection/identification. In one configuration, the selection component 1012 may be configured to select the random resource selection procedure for identifying a resource for transmitting one or more packets (e.g., when no sensing history information is available at the time when the one or packets are ready for transmission) and subsequently select the sensing based resource selection procedure for transmitting additional packets if a time interval for sensing has elapsed.

In various configurations, depending on the type of resource selection procedure selected based on the configuration information 1009, the selection component 1012 may be further configured to provide input and/or activate one of the sensing based resource selection component 1014 or the random resource selection component 1016 at a given time. For example, when the random resource selection is selected, the selection component 1012 may activate the random resource selection component 1016, e.g., to control resource selection for transmission, and when the sensing based resource selection is selected, the selection component 1012 may activate the sensing based resource selection component 1014.

The sensing based resource selection component 1014 may be configured to perform/implement the sensing based resource selection. In some configurations, as part of being configured to perform the sensing based resource selection, the sensing based resource selection component 1014 may be configured to identify a resource based on sensing performed for a pre-defined amount of time, where the sensing (e.g., performed by the sensing component 1006) comprises monitoring for transmissions from other UEs for the pre-defined amount of time. In some configurations the pre-defined amount of time is less than one second. The identified resource may then be used for transmitting data packets corresponding to a V2V message. In some configurations, there may be multiple levels of low priority which may be assigned by the apparatus 1002 to data packets based on, e.g., type of the V2V message to which the packets correspond. In some such configurations, the configuration information 1009 may further indicate multiple corresponding sensing periods for selecting a resource for transmissions of packets having the different low priorities. In some such configurations, the sensing based resource selection component 1014 may be configured to use different sensing periods to select resources for transmission of packets having the different low priorities. For example if there are three levels of low priorities, e.g., L1, L2, and L3, where L3 being the lowest of the low priority levels, then for example, use a 100 ms sensing period for selecting a resource for a packet having the level L3, use a 300 ms sensing period for selecting a resource for a packet having the level L2, and use a 500 ms sensing period for a packet having the having the level L1.

The random resource selection component 1016 may be configured to perform/implement the random resource selection procedure. In some configurations, as part of being configured to perform the random resource selection, the random resource selection component 1016 may be configured to generate a pseudorandom number, e.g., using a random function, and identify a resource for transmission of one or more V2V data packets, based on the generated pseudorandom number. The random function may be implemented as the random function component 800 and thus the random function component 800 may be included within or as part of the random resource selection component 1016 in some configurations. In some configurations, the resource for transmission is identified using the generated pseudorandom number, from a plurality of resources in a first communication resource pool, e.g., an exception resource pool, which is different from a second communication resource pool, e.g., a normal resource pool, used in the sensing based resource selection procedure. For example, if there are 2000 resources available, each resource may have an associated identifier. The random function may be configured to generate the random number between 1 and 2000 (inclusive). The generated random number may be mapped to an identifier of a resource. The resource corresponding to the mapped identifier may thus be selected/identified for the V2V transmission. In various configurations, the seed for the randomization function and a time at which resource selection occurs may be used as inputs to the randomization function which allows the randomization function to generate random (e.g., different) resource numbers for selection by the UE. In an additional aspect, the identity of the UE may be mapped to a seed for the randomization function. This allows different UEs to generate different pseudorandom numbers so that the multiple UEs using random resource selection do not generate the same pseudorandom numbers and thus the likelihood of UEs selecting the same resource for transmissions may be reduced In some configurations, once one or more packets corresponding to a V2V message are generated and waiting for transmission, the apparatus 1002 may have, for example, up to 100 ms, for generating the pseudorandom number for selecting a resource and transmitting the one or more packets using the identified resource.

The transmission component 1018 may be configured to transmit the one or more packets corresponding to the V2V message using the identified resource. The information regarding the identified/selected resource may be provided by the sensing based resource selection component 1014 or the random resource selection component 1016. Depending on the type of the resource selection procedure selected at a given time based on the configuration information 1009 and thus in turn depending on the resource identified, e.g., using sensing based resource selection component 1014 or the random resource selection component 1016, the transmission component 1018 may be configured to transmit the one or more packets on a sensing based selected resource or randomly selected resource.

Figure 11:
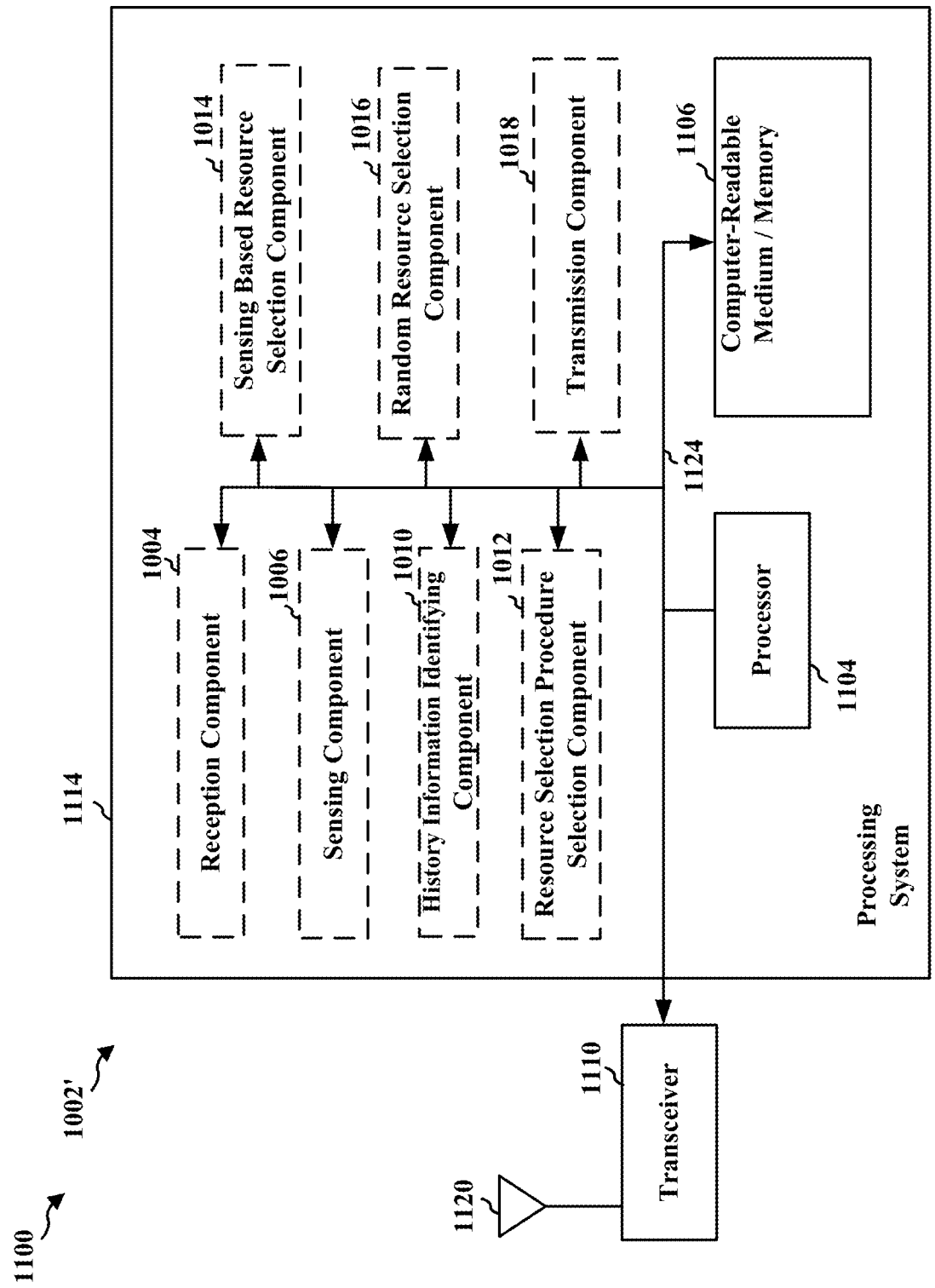
FIG. 11 is a diagram illustrating an example of a hardware implementation for an apparatus employing a processing system.

The apparatus may include additional components that perform each of the blocks of the algorithm in the aforementioned flowcharts of FIGS. 5, 6 and 7. As such, each block in the aforementioned flowcharts of FIGS. 5, 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1010, 1012, 1014, 1016, 1018 and the computer-readable medium/memory 1106 (which may include storage component 1008). The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1018, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication, e.g., V2V communication, includes means for identifying that recent sensing history information at the apparatus is unavailable for a sensing based resource selection procedure, and means for selecting, in response to identifying that the recent sensing history information is unavailable, a resource selection procedure based on configuration information obtained from a network entity. In some configurations, the resource selection procedure comprises a random resource selection procedure, the sensing based resource selection procedure, or a combination thereof. In some configurations, the means for selecting the resource selection procedure is configured to select the random resource selection procedure. In some such configurations, the apparatus 1002/1002' further comprises means for performing the random resource selection procedure, the means for performing the random resource selection procedure being configured to generate a pseudorandom number and identify a resource for the V2V communications based on the generated pseudorandom number. The pseudorandom number may be generated using a randomization function. In some configurations, a seed for the randomization function and a time at which resource selection occurs are used as inputs to the randomization function. In some configurations, the resource for V2V communications is identified, based on the generated pseudorandom number, from a plurality of resources in a first communication resource pool which is different from a second communication resource pool used in the sensing based resource selection. In some configurations, the apparatus 1002/1002' may further include means for transmitting one or more packets using the resource identified by the random resource selection procedure. In some such configurations, the means for selecting the resource selection procedure is further configured to select the sensing based resource selection procedure for transmitting additional packets if a time interval for sensing has elapsed. In some such configurations, the means for transmitting may be further configured to transmit the additional packets using a resource identified based on the sensing based resource selection procedure.

In some configurations, the means for selecting the resource selection procedure is configured to select the sensing based resource selection procedure. In some such configurations, the apparatus 1002/1002' may further include means for performing the sensing based resource selection procedure, the means for performing the sensing based resource selection procedure being configured to identify a resource based on sensing performed for a pre-defined amount of time. In some configurations, the apparatus 1002/1002' may further include means for performing sensing, the means for performing the sensing being configured to monitor for transmissions from other UEs for the pre-defined amount of time. In some such configurations the means for transmitting may be configured to transmit one or more packets using the resource identified by the sensing. In some configurations the pre-defined amount of time is less than one second.

In accordance with one aspect of some configurations, the means for selecting the resource selection procedure is configured to select the resource selection procedure further based on a priority of a packet to be transmitted from the UE. In some such configurations, the means for selecting the resource selection procedure is configured to select a random resource selection procedure for transmission of packets with a high priority. In some such configurations, the means for selecting the resource selection procedure is configured to select a sensing based resource selection procedure for transmission of packets with a low priority.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of vehicle-to-vehicle (V2V) communications by a user equipment (UE), comprising:
    determining if sensing history information is available at the UE for a sensing based resource selection procedure, the sensing history information comprising sensing data for a predefined prior time period; and
    selecting, in response to determining that the sensing history information is unavailable, a resource selection procedure based on configuration information obtained from a network entity in communication with the UE, wherein selecting the resource selection procedure based on the configuration information comprises selecting a random resource selection procedure, wherein the random resource selection procedure comprises:
    generating a pseudorandom number; and
    identifying a resource for the V2V communications based on the generated pseudorandom number, wherein the pseudorandom number is generated using a randomization function, and wherein a seed for the randomization function and a time at which resource selection occurs are used as inputs to the randomization function.

2. The method of claim 1, wherein the resource selection procedure comprises a combination of the random resource selection procedure and the sensing based resource selection procedure.

3. The method of claim 2, further comprising, transmitting, by the UE, one or more packets using the resource identified by the random resource selection procedure.

4. The method of claim 1, wherein the resource for V2V communications is identified, based on the generated pseudorandom number, from a plurality of resources in a first communication resource pool which is different from a second communication resource pool used in the sensing based resource selection procedure.

5. The method of claim 1, wherein the seed is associated with an identity of the UE.

6. The method of claim 4, further comprising:
    selecting the sensing based resource selection procedure for transmitting additional packets if a time interval for sensing has elapsed.

7. The method of claim 6, wherein the sensing based resource selection procedure comprises identifying a resource, from the second communication resource pool, based on sensing performed for a pre-defined amount of time.

8. The method of claim 2, wherein selecting the resource selection procedure comprises selecting the sensing based resource selection procedure, wherein the sensing based resource selection procedure comprises:
    identifying a resource based on sensing performed for a pre-defined amount of time, the sensing comprising monitoring for transmissions from other UEs for the pre-defined amount of time, wherein the pre-defined amount of time is less than one second; and
    transmitting, by the UE, one or more packets using the resource identified by the sensing.

9. The method of claim 1, wherein the sensing history information is associated with transmissions received at the UE from other UEs in a previous one second.

10. The method of claim 9, wherein the sensing history information is not available at the UE due to a resource pool configuration change, a transmission channel change, a handover, a power-on event, or a combination thereof.

11. The method of claim 1, wherein the configuration information is pre-configured at the UE.

12. The method of claim 1, wherein selecting the resource selection procedure is further based on a priority of a packet to be transmitted from the UE.

13. The method of claim 12, wherein a random resource selection procedure is selected for transmitting packets with a high priority.

14. The method of claim 12, wherein a sensing based resource selection procedure is selected for transmitting packets with a low priority.

15. A user equipment (UE) for vehicle-to-vehicle (V2V) communications, comprising:
    means for determining if sensing history information is available at the UE for a sensing based resource selection procedure, the sensing history information comprising sensing data for a predefined prior time period; and
    means for selecting, in response to determining that the sensing history information is unavailable, a resource selection procedure based on configuration information obtained from a network entity in communication with the UE, wherein the means for selecting the resource selection procedure based on the configuration information is configured to select a random resource selection procedure, and wherein the UE further comprises:
    means for performing the random resource selection procedure, the means for performing the random resource selection procedure being configured to generate a pseudorandom number and identify a resource for the V2V communications based on the generated pseudorandom number, the pseudorandom number being generated using a randomization function, a seed for the randomization function and a time at which resource selection occurs being used as inputs to the randomization function.

16. The UE of claim 15, wherein the resource selection procedure comprises a combination of the random resource selection procedure and the sensing based resource selection procedure.

17. The UE of claim 16 wherein the UE further comprises means for transmitting one or more packets using the resource identified by the random resource selection procedure.

18. The UE of claim 15, wherein the resource for V2V communications is identified, based on the generated pseudorandom number, from a plurality of resources in a first communication resource pool which is different from a second communication resource pool used in the sensing based resource selection procedure.

19. The UE of claim 15, wherein the means for selecting the resource selection procedure is further configured to select the sensing based resource selection procedure for transmitting additional packets if a time interval for sensing has elapsed.

20. The UE of claim 16, wherein the means for selecting the resource selection procedure is configured to select the sensing based resource selection procedure, and wherein the UE further comprises:
    means for performing the sensing based resource selection procedure, the means for performing the sensing based resource selection procedure being configured to identify a resource based on sensing performed for a pre-defined amount of time;
    means for performing the sensing, the means for performing the sensing being configured to monitor for transmissions from other UEs for the pre-defined amount of time, wherein the pre-defined amount of time is less than one second; and
    means for transmitting one or more packets using the resource identified by the sensing.

21. The UE of claim 15, wherein the means for selecting the resource selection procedure is configured to select the resource selection procedure further based on a priority of a packet to be transmitted from the UE.

22. The UE of claim 21, wherein the means for selecting the resource selection procedure is configured to select a random resource selection procedure for transmission of packets with a high priority.

23. The UE of claim 21, wherein the means for selecting the resource selection procedure is configured to select a sensing based resource selection procedure for transmission of packets with a low priority.

24. A user equipment (UE) for vehicle-to-vehicle (V2V) communications, comprising:
    a memory; and
    at least one processor coupled to the memory and configured to:
        determine if sensing history information is available at the UE for a sensing based resource selection, the sensing history information comprising sensing data for a predefined prior time period; and
    select, in response to determining that the sensing history information is unavailable, a resource selection procedure based on configuration information obtained from a network entity in communication with the UE, wherein the at least one processor is configured, as part of being configured to select the resource selection procedure based on the configuration information, to select a random resource selection procedure; and
        wherein the at least one processor is further configured to:
            perform the random resource selection procedure, wherein as part of being configured to perform the random resource selection procedure, the at least one processor is further configured to generate a pseudorandom number and identify a resource for the V2V communications based on the generated pseudorandom number, the pseudorandom number being generated using a randomization function, a seed for the randomization function and a time at which resource selection occurs being used as inputs to the randomization function.

25. The UE of claim 24, wherein the resource selection procedure comprises a combination of the random resource selection procedure and the sensing based resource selection procedure.

26. The UE of claim 24,
    wherein the at least one processor is further configured to transmit one or more packets using the resource identified by the random resource selection procedure.

27. The UE of claim 25, wherein the at least one processor is further configured, as part of being configured to select the resource selection procedure based on the configuration information, to select the sensing based resource selection procedure; and
    wherein the at least one processor is further configured to:
        perform the sensing based resource selection procedure, wherein as part of being configured to perform the sensing based resource selection procedure, the at least one processor is further configured to identify a resource based on sensing performed for a pre-defined amount of time;
        perform the sensing, the sensing comprising monitoring for transmissions from other UEs for the pre-defined amount of time, wherein the pre-defined amount of time is less than one second; and
        transmit one or more packets using the resource identified by the sensing.

28. The UE of claim 24, wherein the at least one processor is configured to select the resource selection procedure further based on a priority of a packet to be transmitted from the UE.

29. The UE of claim 28, wherein the at least one processor is configured to select a random resource selection procedure for transmission of packets with a high priority and select a sensing based resource selection procedure for transmission of packets with a low priority.

30. A non-transitory computer-readable medium storing computer executable code for vehicle-to-vehicle (V2V) communications by a user equipment (UE), comprising code to:
    determine if sensing history information is unavailable for a predefined prior time period at the UE for a sensing based resource selection procedure, the sensing history information comprising sensing data for a predefined prior time period; and
    select, in response to determining that the sensing history information is available, a resource selection procedure based on configuration information obtained from a network entity in communication with the UE, wherein the resource selection procedure based on the configuration information selects a random resource selection procedure; and
    further comprising code to:

generate a pseudorandom number; and
identify a resource for the V2V communications based on the generated pseudorandom number, wherein the pseudorandom number is generated using a randomization function, and wherein a seed for the randomization function and a time at which resource selection occurs are used as inputs to the randomization function.

* * * * *